US006907725B2

United States Patent
Szymkowicz et al.

(10) Patent No.: US 6,907,725 B2
(45) Date of Patent: Jun. 21, 2005

(54) METHOD FOR REDUCING ENGINE EXHAUST EMISSIONS

(75) Inventors: Patrick G. Szymkowicz, Shelby Township, MI (US); Arjun D. Tuteja, Novi, MI (US); Roger B. Krieger, Birmingham, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/426,421

(22) Filed: Apr. 30, 2003

(65) Prior Publication Data

US 2004/0216449 A1 Nov. 4, 2004

(51) Int. Cl.[7] ................................................. F01N 3/00
(52) U.S. Cl. ............................... 60/285; 60/274; 60/284; 60/286
(58) Field of Search .......................... 60/285, 286, 295, 60/274, 284

(56) References Cited

U.S. PATENT DOCUMENTS

| | | | |
|---|---|---|---|
| 4,134,261 A | * | 1/1979 | Iizuka et al. .................. 60/276 |
| 4,467,602 A | * | 8/1984 | Iizuka et al. .................. 60/276 |
| 5,598,814 A | | 2/1997 | Schroeder et al. |
| 5,709,180 A | | 1/1998 | Spath |
| 6,023,929 A | * | 2/2000 | Ma ............................. 60/295 |
| 6,164,065 A | * | 12/2000 | Denari et al. ................. 60/284 |
| 6,209,526 B1 | * | 4/2001 | Sun et al. .................... 123/481 |
| 6,360,705 B1 | | 3/2002 | Raghavan |
| 6,389,806 B1 | * | 5/2002 | Glugla et al. ................. 60/284 |
| 6,408,618 B2 | * | 6/2002 | Ide .............................. 60/285 |

* cited by examiner

Primary Examiner—Thomas E. Denion
(74) Attorney, Agent, or Firm—Kathryn A. Marra

(57) ABSTRACT

Exhaust gas temperature is increased to improve the effectiveness of an after-treatment system having an activation temperature by deactivating one or more engine cylinders to increase the exhaust gas temperature from the remaining cylinders (during acceleration) or to decreasing exhaust gas flow rate (during deceleration or idling). In the system of the invention, a controller effects the deactivation and reactivation of cylinders and/or decrease and increase of exhaust gas flow in response to one or more sensors providing input of exhaust gas temperature or information from which exhaust gas temperature can be approximated. By achieving and maintaining the activation temperature, the present invention improves the effectiveness of after-treatment devices thereby lowering regulated emissions to desired levels.

10 Claims, 5 Drawing Sheets

METHOD FOR REDUCING ENGINE EXHAUST EMISSIONS

FIELD OF THE INVENTION

The present invention relates generally to methods and systems for reducing regulated emissions in the exhaust of an internal combustion engine.

BACKGROUND OF THE INVENTION

Vehicles powered by internal combustion engines are typically equipped with exhaust after-treatment catalysts, filters, adsorbents, and other devices to comply with regulatory exhaust emission standards for carbon monoxide (CO), unburned hydrocarbons (HC), oxides of nitrogen (NOx), particulate matter (PM), and so on. The effectiveness of exhaust after-treatment devices for removing the regulated emissions can vary with engine operating conditions, particularly temperature. Generally, there are minimum temperature requirements for successful implementation of after-treatment devices. These minimum temperature requirements are commonly referred to as "activation temperatures" for the devices. For the successful application of a given after-treatment device, the level of pollutant removal is usually not sufficient when the temperature is less than the activation temperature. In general, activation temperatures are dynamic in nature and vary depending on the after-treatment device, the application of the device, and the targeted pollutant removal.

For example, FIG. 1 shows the impact of temperature on oxidation catalyst efficiency of one catalyst that illustrates behavior typical for commercially used catalysts. As temperature increases the oxidation efficiency increases dramatically until it plateaus at a relatively high value. The temperature at which the catalyst's efficiency begins to plateau at the relatively high value is referred to as the catalyst's activation temperature. The catalyst of FIG. 1 has an activation temperature of about 200° C., where its efficiency is about 80%. (This intersection is shown as point 100 in FIG. 1.) After about 200° C., increases in catalyst efficiency are gradual and modest. The increase in efficiency before reaching the activation temperature is sharp; the example illustrated in FIG. 1 has an increase from about 10% efficiency to about 80% efficiency (an eight-fold increase in efficiency) between 150° C. and its activation temperature of 200° C. Thus, small decreases in temperature below the activation temperature of an after-treatment device can result in a significant reduction in the efficiency of the device for treating the regulated emissions in the exhaust stream.

During vehicle operation, the exhaust gas temperature varies depending on factors such as the engine speed, load, and controls change with driving conditions. FIG. 2 shows the exhaust gas temperature for a vehicle operating on a given driving cycle. Vehicle acceleration increases the engine load, which results in increased exhaust gas temperature. Generally, exhaust gas temperatures are maintained as the vehicle cruises at highway speeds. During vehicle deceleration and idle conditions, however, the exhaust gas temperature rapidly decreases. Other driving conditions, such as driving at low speeds in winter weather, lead to low exhaust gas temperatures.

The driving schedule and engine-vehicle system, then, together can result in periods during which the exhaust gas temperatures are below the activation temperatures needed for the after-treatment devices used on the vehicle to achieve the desired emissions reduction. For example, the oxidation catalyst shown in FIG. 1 has an activation temperature of about 200° C. The exhaust gas temperature shown in FIG. 2, however, is frequently below 200° C. At the lower temperatures, the regulated emissions elimination efficiency, or "conversion efficiency," of the oxidation catalyst will drop below the optimum, desired level. In the example of FIG. 1, the desired conversion efficiency level is at least 80%. If the catalyst were used for treating exhaust from a vehicle that generated exhaust gas temperatures as illustrated in FIG. 2, the exhaust gas would be at temperatures below the activation temperature of the catalyst a significant fraction of the time. In the right-hand third of the graph, exhaust gas temperatures that are often from about 150° C. to about 160° C. provide catalyst efficiencies of less than 20%. Under such circumstances, additional steps must be taken to achieve the desired level of emissions removal.

It would, therefore, be desirable to develop technologies that control the exhaust gas flow rate and temperature to achieve and maintain the activation temperatures of the after-treatment devices.

SUMMARY OF THE INVENTION

The present invention relates to a method and system for modifying engine operation to increase exhaust gas temperature in order to increase the effectiveness of an after-treatment system having an activation temperature. In the method, exhaust gas temperature is increased by deactivating one or more engine cylinders and/or by decreasing exhaust gas flow rate. In the system of the invention, a controller effects the deactivation and reactivation of cylinders and/or decrease and increase of exhaust gas flow in response to one or more sensors providing input of exhaust gas temperature or information from which exhaust gas temperature can be approximated.

This method of reducing exhaust gas flow rate and/or increasing exhaust gas temperature can be used to achieve and maintain exhaust gas treatment at activation temperatures during vehicle conditions that would otherwise result in exhaust gas treatment at temperatures below the activation temperature or temperatures of after-treatment devices. By achieving and maintaining treatment at or above the activation temperature, the present invention improves the effectiveness of after-treatment devices thereby lowering regulated emissions to desired levels.

In another aspect, this invention for temperature control can be used to regenerate aftertreatment devices for which regeneration is necessary for effective treatment of exhaust gas.

Exhaust gas temperature is increased to improve the effectiveness of an after-treatment system having an activation temperature by deactivating one or more engine cylinders to increase the exhaust gas temperature from the remaining cylinders (during acceleration) or to decreasing exhaust gas flow rate (during deceleration or idling). In the system of the invention, a controller effects the deactivation and reactivation of cylinders and/or decrease and increase of exhaust gas flow in response to one or more sensors providing input of exhaust gas temperature or information from which exhaust gas temperature can be approximated. By achieving and maintaining the activation temperature, the present invention improves the effectiveness of after-treatment devices thereby lowering regulated emissions to desired levels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
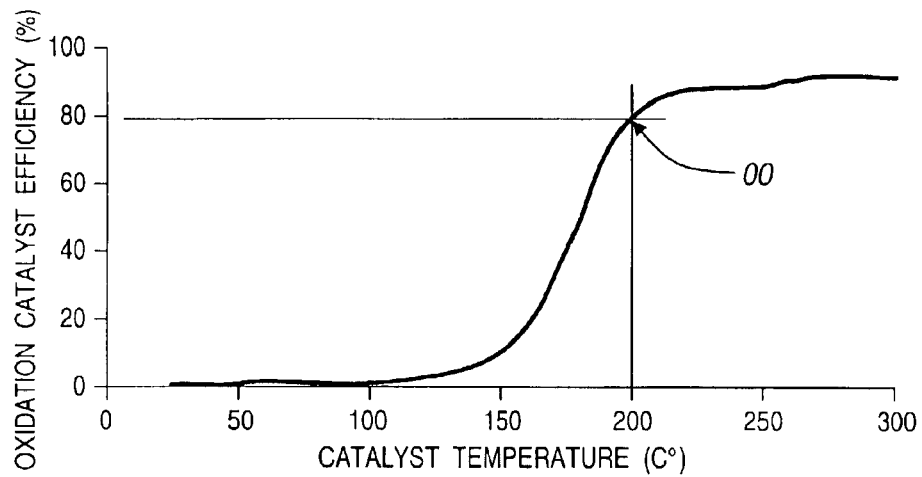
FIG. 1 is a graph of oxidation catalyst efficiency versus catalyst temperature.
Figure 2:
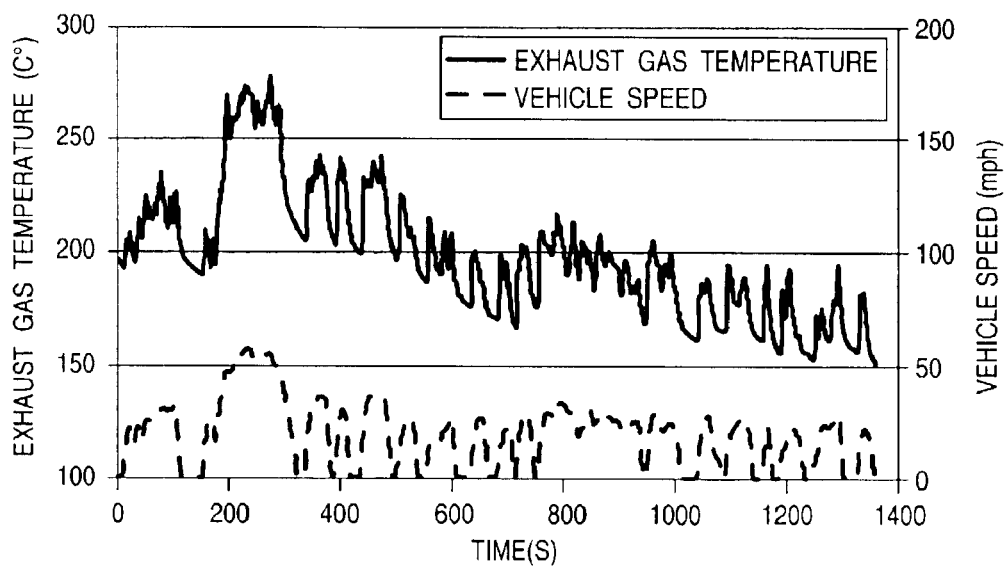
FIG. 2 is a graph showing the effect of vehicle speed on exhaust gas temperature for a period of time.

The following description of the preferred embodiment(s) is merely exemplary in nature and is in no way intended to limit the invention, its application, or uses.

In a first embodiment, exhaust gas temperature is increased to achieve and maintain an activation temperature of an exhaust treatment system by deactivating an engine cylinder. Deactivation depends upon the vehicle engine conditions during driving. Vehicle engine conditions can be described as acceleration, cruise, deceleration, and idle. During acceleration, the output work is evenly distributed among the cylinders of the engine. During acceleration and cruising, specifically controlled engine operating conditions may be combined with the deactivation of one or more cylinders to increase the exhaust gas temperature. The specifically controlled engine operating conditions include, for example and without limitation, fuel injection characteristics, intake charge throttling or boosting, exhaust gas recirculation, combustion timing and rate control, exhaust gas flow and temperature, and combinations of these.

The deactivated cylinder produces no work and the airflow through the cylinder is significantly reduced or eliminated. To compensate for a deactivated cylinder, the work from the active cylinders must be increased so the engine output work remains unchanged. The same required work is divided between few cylinders, resulting in higher work loads for the active cylinders. The higher work loads increase the exhaust gas temperatures from each cylinder and, hence, the temperature of the stream of combined exhaust gases from all the cylinders. The period of deactivation and the number of cylinders deactivated are adjusted to attain and maintain an exhaust gas temperature adequate to provide the desired activation temperature for the after-treatment device. In particular, one or more cylinders are deactivated during a time when the engine is providing output work (i.e., during acceleration or maintaining highway speeds) in order to increase the temperature of the exhaust gas from the remaining cylinders, as measured in an after-treatment device comprising a catalyst, to be equal to or greater than the catalyst activation temperature.

Methods and systems for deactivating engine cylinders, which have been used to improve fuel economy, are known and include electrical valve actuators, electro-hydraulic valve actuators, hydraulic valve actuators, and other valve camshaft control technologies. Specific mechanisms are described, for example, in Raghavan et al., U.S. Pat. No. 6,360,705; Spath, U.S. Pat. No. 5,709,180; and Schroeder et al., U.S. Pat. No. 5,598,814, the entire disclosure of each of these patents being incorporated herein by reference. The Raghavan patent '705 discloses a variable valve lift mechanism in the engine cylinder head involving greater or lesser displacement of the valve, that includes allowing the cylinder to be deactivated, by adjusting the pivot point of a rocker arm of the lift mechanism. The Spath patent '180 discloses a two-step lifter for a valve having outer and inner cam followers. The Schroeder patent '814 discloses individual control of a valve in which the valve is driven by a rotary electric motor. The valve may be deactivated by stopping the motor.

Figure 3:
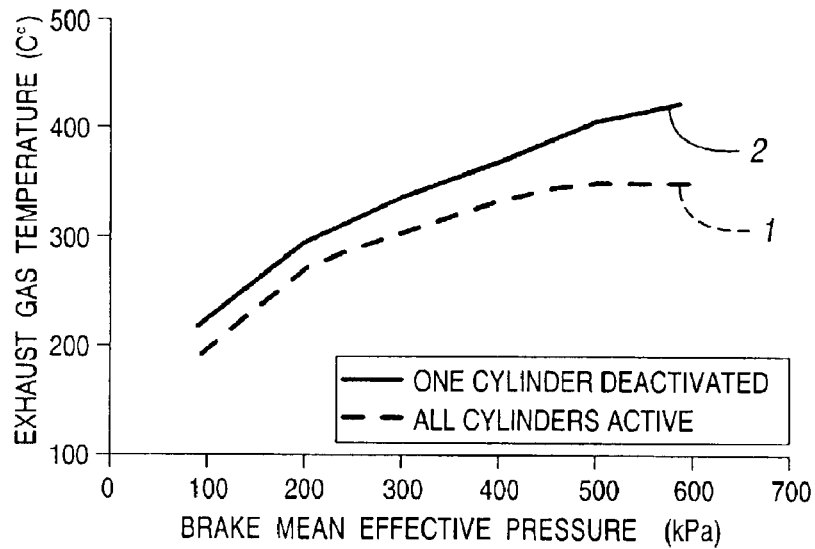
FIG. 3 is a graph of exhaust gas temperature versus brake mean effective pressure when all engine cylinders are active and when one engine cylinder is deactivated.

FIG. 3 shows an example of how exhaust gas temperature increases with engine output (represented in FIG. 3 by the brake mean effective pressure) for a particular engine. Curve 1 shows the relationship between exhaust gas temperature when all cylinders of the engine are operating; curve 2 shows the same relationship for the engine when one cylinder is deactivated. For a given engine output, the exhaust gas temperature is higher when one of the cylinders is deactivated. The increase in exhaust gas temperature for any particular engine will depend on the engine design (e.g., the number of engine cylinders and size of the engine), the specifically controlled engine operating conditions (e.g., intake charge air-to-fuel ratio, exhaust gas recirculation, combustion timing and rate, and fuel injection characteristics), the number of cylinders deactivated, and other parameters.

The operation temperature of an after-treatment devices may be measured by a sensor or, alternatively, approximated by knowledge of engine and environmental conditions, which may be derived from other engine sensors, such as engine speed, mass airflow meter, exhaust gas recirculation valve position, throttle position, intake system pressure and exhaust system pressure. Achieving and maintaining an activation temperature for the after-treatment device improves the effectiveness of the after-treatment device and thus decreases regulated emissions from the vehicle.

Figure 4:
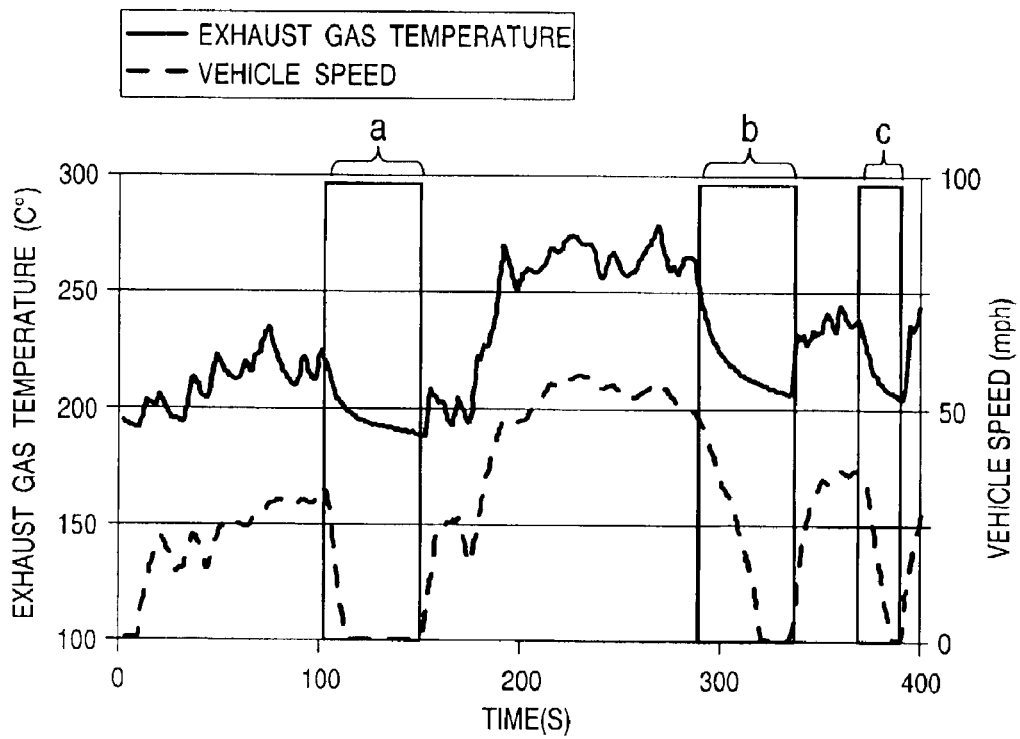
FIG. 4 is a graph showing the effect of vehicle speed with periods of deceleration and idle on exhaust gas temperature for a period of time.

In another embodiment, exhaust flow rate is decreased to achieve and maintain activation temperatures of the exhaust treatment system. During deceleration and idle conditions, the exhaust gas temperature from most internal-combustion engines is significantly lower than during acceleration and cruise conditions. FIG. 4 shows the exhaust gas temperature during a typical driving schedule. Areas a, b, and c of the graph illustrate periods of deceleration and idle, during which exhaust gas temperature rapidly decreases. As a result, deceleration and idle conditions will generally lower the temperature of after-treatment devices. Prolonged or repeated deceleration or idle conditions during a period of time can drop after-treatment device temperature to below its activation temperature. This reduces the effectiveness of the after-treatment devices and the undesirable emissions will increase to unacceptable levels.

Figure 5:
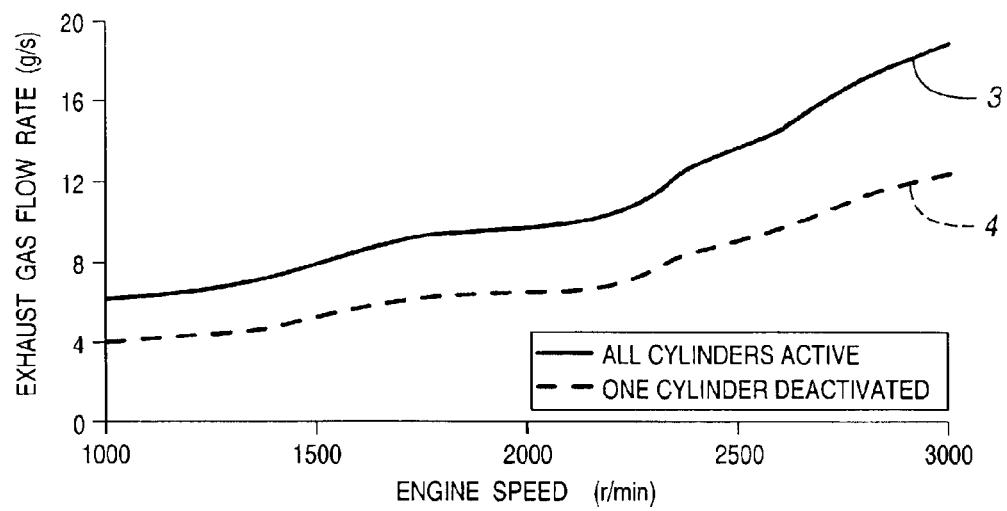
FIG. 5 is a graph of exhaust gas flow rate versus engine speed when all engine cylinders are active and when one engine cylinder is deactivated.

To prevent such drop in temperature, the exhaust gas flow rate during deceleration or engine idle can be reduced by deactivating one or more engine cylinders. Because exhaust gas temperatures are generally low during deceleration or idling, lowering the exhaust flow rate reduces the cooling of the after-treatment device by the cooling exhaust gas. FIG. 5 illustrates the effect of deactivating a cylinder when the engine is at idle. Curve 3 shows the relationship between exhaust gas temperature when all cylinders of the engine are operating at idle conditions; curve 4 shows the same relationship for the engine when one cylinder is deactivated at idle conditions. The active cylinders are then operated at substantially higher load to compensate for the work lost by the deactivated cylinders. As before, the highly loaded cylinders have higher exhaust gas temperatures, allowing the exhaust gas to achieve and maintain the activation temperatures of the after-treatment system devices. Similarly, one or more cylinders may be deactivated during idling to both reduce the exhaust gas flow rate and ensure that the exhaust gas is at a higher temperature.

Deactivating one or more cylinders may be combined with other methods of increasing exhaust gas temperature, such as by adjusting the intake air throttle or recirculating exhaust gas back into the intake air manifold through an exhaust gas recirculation valve in piping between the exhaust and intake manifolds of the engine, adjusting the timing and rate of combustion, and injecting fuel into the exhaust system. Deactivation and re-activation of the engine cylinders is preferably carried out so that the driver of the vehicle cannot detect a change in engine performance. In general, any change in performance will be slight; if more performance is required from the engine, a cylinder can be re-activated because the higher performance will result in higher exhaust gas temperatures even with another cylinder activated. The delay in the change in engine condition between idling or deceleration, when one or more cylinders may be deactivated, and a demand for acceleration, when the cylinders are reactivated by the engine controller, should be so slight as to be undetected by the driver.

Figure 6:
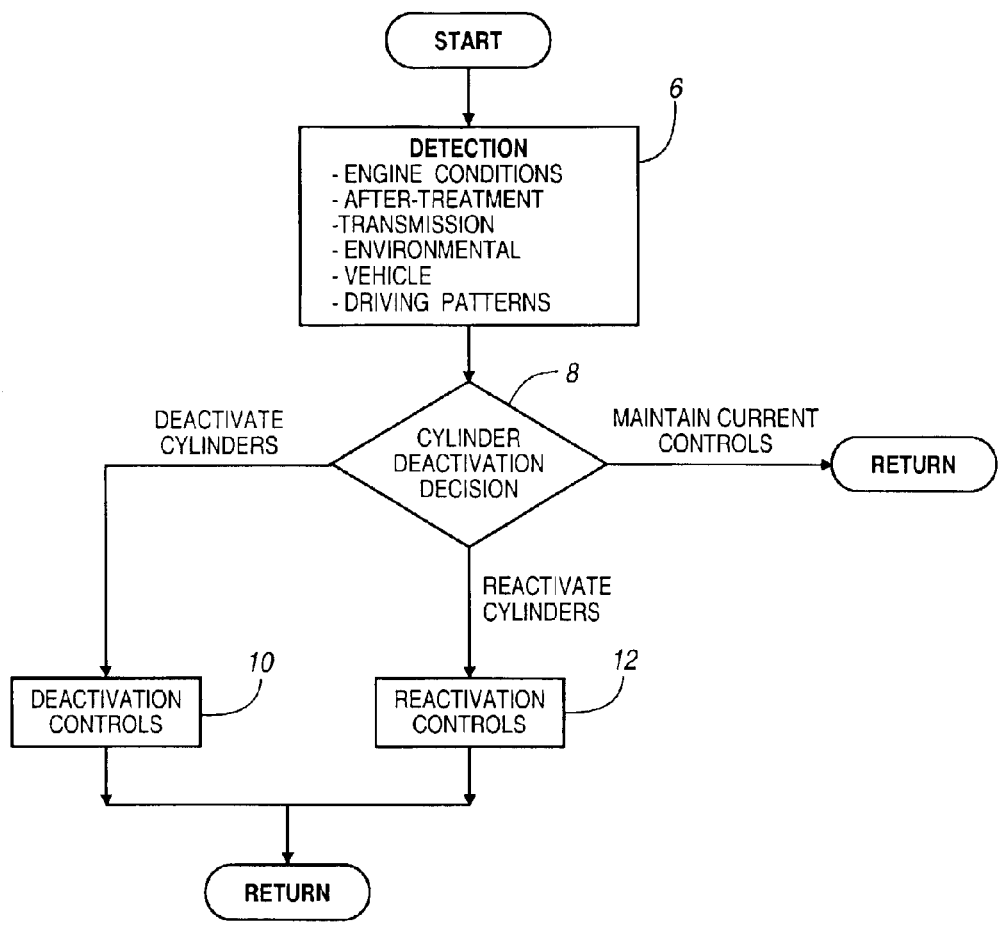
FIG. 6 is a flow chart illustrating an embodiment of the invention.

According to the flow chart in FIG. 6, in a first procedural step 6, a control data set is generated in an engine controller. The data set contains information about, or from which information may be derived about, whether the temperature in the after-treatment device is less than, equal to, or greater than an activation temperature for the after-treatment device. The data may also include, for example and without limitation, information about the vehicle engine conditions (whether the vehicle is accelerating, cruising, decelerating, or stopped with the engine idling), the number of cylinders and the effect of deactivating between one and one less than all of the cylinders for the particular engine and vehicle, the number of after-treatment devices, the environmental conditions in which the engine is operating, and so on. The other detection items in procedural step 6 may also be considered in making the deactivation decision. For example, information received from the transmission may be used to determine whether deactivation or reactivation would likely be apparent to the driver in the current driving gear (first, second gear, etc.). Driving patterns may be monitored to determine whether frequent gear shifting suggests a delay in deactivation. The controller logic uses the control data set in step 8 to determine whether to deactivate an active cylinder, in which case the controller employs deactivation controls 10, activate a deactivated cylinder, in which case the controller employs reactivation controls 12, or maintain the cylinders as they are. For example, the controller may deactivate a cylinder to achieve higher exhaust gas temperature at the same operating condition or to maintain the same exhaust temperature when beginning to decelerate or idle. The controller may activate a deactivated cylinder when the vehicle engine condition changes to one requiring more work output, i.e., when the vehicle begins to accelerate after idling or a period of deceleration. Finally, the controller may maintain the status quo, for example, while idling while an exhaust gas temperature is being maintained or during a period when the exhaust gas temperature is increasing but has not yet reached a desired value. After employing deactivation controls 10, reactivation controls 12, or determining to maintain current controls, the controller continues to receive updated information for its control data set 6 from one or more sensors, periodically revisiting decision step 8 during engine operation.

Figure 7:
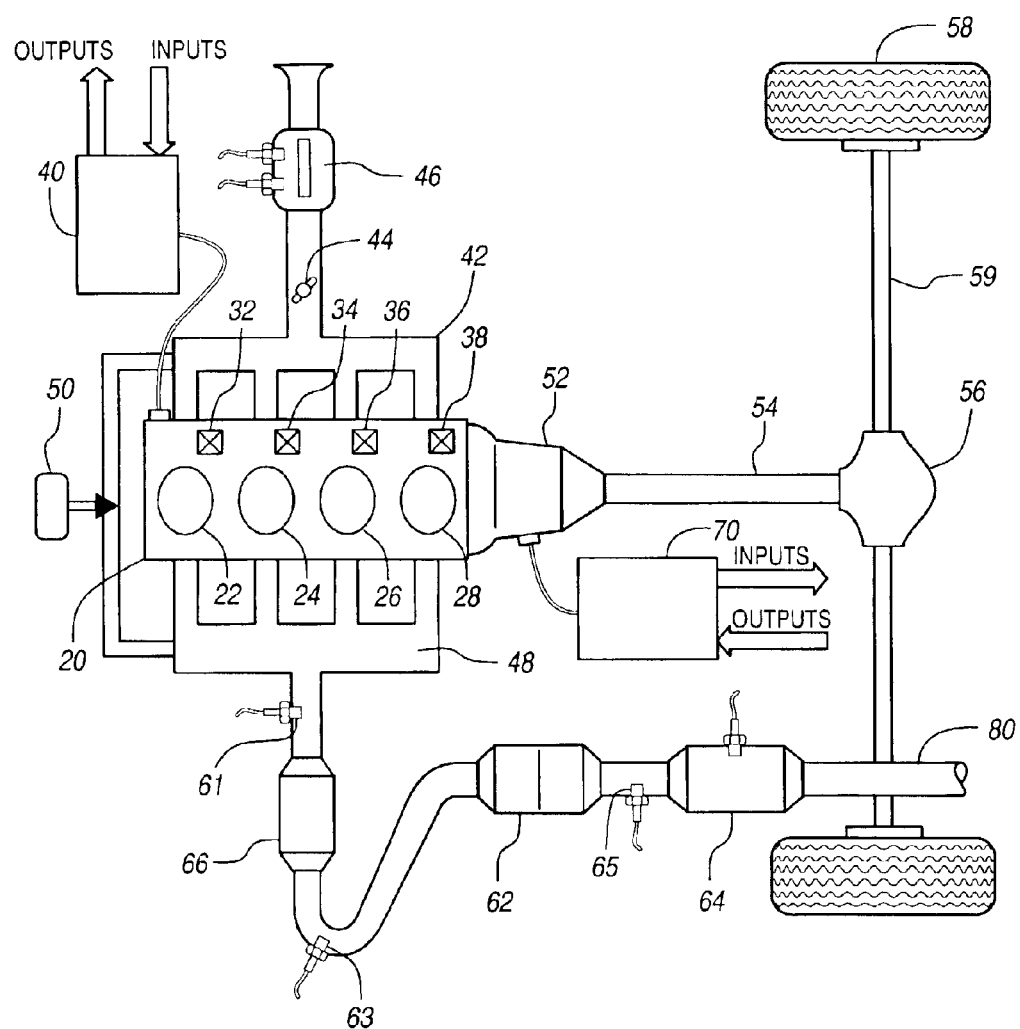
FIG. 7 is a is a functional block diagram of an engine with exhaust gas after-treatment system having controls for cylinder deactivation in response to sensor input(s).

FIG. 7 shows an embodiment of the system in which engine 20 includes cylinders 22, 24, 26, 28, air intake manifold 42, exhaust manifold 48, exhaust gas recirculation valve 50 that permits exhaust gas from exhaust manifold 48 to enter intake manifold 42, and various after-treatment devices 60, 62, and 64 located along tailpipe 80. Engine 20 provides power to transmission 52, which turns drivetrain 54. Drivetrain 54 provides power to wheels 58 on axle 59 through differential 56. Cylinders 22, 24, 26, 28 are each connected to a cylinder deactivation mechanism, represented in FIG. 7 by boxes 32, 34, 36, and 38.

The deactivation mechanisms are controlled by electronic control unit 40, which receives various inputs. Electronic control unit 40 received inputs from intake manifold 42 concerning air flow rate, air pressure, and air temperature as measured at sensor location 46 and the position of throttle 44. Electronic control unit 40 may receive information from transmission electronic control unit 70. Each after-treatment device may be directed to treatment of a specific emission component or group of components and may employ one or more different catalysts, or a plurality of treatment devices may be directed at treating the same emissions component (s), optionally using the same catalyst(s). Thus, the activation temperatures of treatment devices 60, 62, and 64 may be the same or different. Sensors 61, 63, and 65 provide information to control unit 40 that may include, for example, gas temperature, gas pressure, gas flow rate, oxygen content, and so on. Electronic control unit 40 includes logic that uses the various inputs from the sensors to determine appropriate output to cylinder deactivation mechanisms 32, 34, 36, and 38 and, optionally, to exhaust gas recirculation valve 50. The sensor may similarly provide information to other engine control mechanisms (e.g., throttle, controller).

The present invention provides a method for reducing engine exhaust emissions by achieving and maintaining the activation temperatures for various exhaust after-treatment system devices. The method involves specifically controlled engine operating conditions and engine cylinder deactivation to increase the exhaust gas temperature and decrease the exhaust gas flow rate compared to the engine operating in a conventional manner. At acceleration and cruise conditions, the specifically controlled engine and cylinder deactivation result in higher exhaust gas temperatures. During deceleration and idle conditions, the exhaust gas flow rate can be reduced to significantly lower the cooling effect of the cool exhaust gases on the after-treatment devices. Also during deceleration conditions, a method is provided for operating the engine and deactivating cylinders to increase the exhaust gas temperature and heat the after-treatment system components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of adjusting exhaust gas temperature in an engine having a plurality of cylinders, comprising steps of
during acceleration and cruising, deactivating at least one but less than all of the cylinders to increase exhaust gas temperature,
during deceleration and idling, deactivating at least one but less than all of the cylinders to decrease exhaust gas flow rate, and
when changing from deceleration or idle to acceleration, reactivating said cylinder or cylinders,
wherein the period of deactivation of the cylinder or cylinders is adjusted to attain and maintain an activation temperature for an after-treatment device.

2. A method according to claim 1, wherein the exhaust gas temperature is determined from the output of a sensor located in the exhaust gas stream downstream from the after-treatment system.

3. A method according to claim 1, wherein the exhaust gas temperature is calculated based on one or more factors selected from the group consisting of engine speed, exhaust gas mass airflow, exhaust gas recirculation valve position, engine throttle position, engine intake system pressure, engine exhaust system pressure, and combinations thereof.

4. A method according to claim 1, further comprising a step of engaging in an engine operating condition to increase exhaust gas temperature selected from the group consisting of modifying fuel injection characteristic, throttling intake charge, boosting intake charge, recirculating exhaust gas, modifying combustion timing and rate, changing exhaust gas flow rate, and combinations thereof.

5. A method according to claim 1, wherein said engine is in an automotive vehicle operated by a driver of said vehicle, and further wherein said driver cannot detect a substantial change in engine performance from said deactivation and reactivation steps.

6. A method according to claim 5, wherein said deactivation and reactivation steps are controlled by an engine controller comprising a control data set, wherein said control data set comprises information selected from the group consisting of information about whether temperature in an after-treatment device is less than, equal to, or greater than an activation temperature for the after-treatment device, information about whether the vehicle state is that of accelerating, cruising, decelerating, stopped, or changing from one state to another state, the number of cylinders activated, the effect on engine performance and exhaust gas of deactivating from one cylinder to one less than all of the cylinders, the number of after-treatment devices, the environmental conditions in which the engine is operating, whether deactivating or reactivating one or more cylinders would likely be apparent to the driver in the current driving gear, and combinations thereof.

7. An apparatus for increasing and maintaining exhaust gas temperature as needed for a desired after-treatment system effectiveness, comprising:
an engine comprising a plurality of cylinders, one or more of which have a cylinder deactivation mechanism controlled by a controller;
an air intake manifold connected to the cylinders for providing air to the cylinders;
an inlet to the intake manifold, said inlet comprising a throttle controlled by the controller;
an exhaust manifold connected to the cylinders for receiving exhaust gas from the cylinders;
an exhaust gas pathway connected to the exhaust manifold at one end and vented to the atmosphere at the other end,
at least one after-treatment device located in the exhaust gas pathway, said after-treatment device having an activation temperature;
and a sensor located in one of the exhaust manifold, the after-treatment device, or a part of the exhaust gas pathway between the exhaust manifold and the after-treatment device, said sensor providing information to the controller about the temperature of the exhaust gas;
wherein the controller comprises logic for engaging the one or more of the cylinder deactivation mechanisms during acceleration and cruising as needed to attain the activation temperature and during deceleration or idle to decrease exhaust gas flow rate to maintain the activation temperature.

8. An apparatus according to claim 7, wherein said one or more cylinder deactivation mechanisms comprise a valve camshaft control.

9. An apparatus according to claim 7, wherein said one or more cylinder deactivation mechanisms comprise a member selected from the group consisting of electrical valve actuators, electro-hydraulic valve actuators, and hydraulic valve actuators.

10. An automotive vehicle, comprising an apparatus according to claim 7.

* * * * *